(12) United States Patent
Kamo et al.

(10) Patent No.: US 12,169,188 B2
(45) Date of Patent: Dec. 17, 2024

(54) BONDING LAYER EVALUATION SYSTEM AND BONDING LAYER EVALUATION METHOD

(71) Applicants: MITSUBISHI HEAVY INDUSTRIES, LTD., Tokyo (JP); KYOTO UNIVERSITY, Kyoto (JP); THE RITSUMEIKAN TRUST, Kyoto (JP)

(72) Inventors: Sota Kamo, Tokyo (JP); Kiyoka Takagi, Tokyo (JP); Naoki Matsuda, Kyoto (JP); Naoki Mori, Shiga (JP)

(73) Assignees: MITSUBISHI HEAVY INDUSTRIES, LTD., Tokyo (JP); KYOTO UNIVERSITY, Kyoto (JP); THE RITSUMEIKAN TRUST, Kyoto (JP)

( * ) Notice: Subject to any disclaimer, the term of this patent is extended or adjusted under 35 U.S.C. 154(b) by 346 days.

(21) Appl. No.: 17/639,471

(22) PCT Filed: Aug. 26, 2020

(86) PCT No.: PCT/JP2020/032172
§ 371 (c)(1),
(2) Date: Mar. 1, 2022

(87) PCT Pub. No.: WO2021/044920
PCT Pub. Date: Mar. 11, 2021

(65) Prior Publication Data
US 2022/0299479 A1   Sep. 22, 2022

(30) Foreign Application Priority Data

Sep. 2, 2019 (JP) .................................. 2019-159852
Dec. 10, 2019 (JP) .................................. 2019-222750

(51) Int. Cl.
G01N 29/12   (2006.01)
G01N 29/44   (2006.01)
G01N 29/46   (2006.01)

(52) U.S. Cl.
CPC ......... *G01N 29/12* (2013.01); *G01N 29/4436* (2013.01); *G01N 29/46* (2013.01)

(58) Field of Classification Search
CPC .... G01N 29/12; G01N 29/4436; G01N 29/46; G01N 29/043; G01N 29/11;
(Continued)

(56) References Cited

U.S. PATENT DOCUMENTS

2014/0216158 A1* 8/2014 Sanabria Martin .... G01N 33/46
73/588
2018/0340858 A1* 11/2018 Jahanbin ................ G01N 29/11

FOREIGN PATENT DOCUMENTS

CN   101846655 A   9/2010
CN   104820017 A   8/2015
(Continued)

OTHER PUBLICATIONS

Ultrasonic evaluation of interlayer interfacial stiffness of multilayered structures (Year: 2012).*
(Continued)

*Primary Examiner* — Xin Y Zhong
(74) *Attorney, Agent, or Firm* — HAUPTMAN HAM, LLP

(57) ABSTRACT

A bonding layer evaluation system includes an elastic wave generation device configured to generate an elastic wave at an evaluation object including a bonding layer; an elastic wave detection device configured to detect the elastic wave from the evaluation object; and a control device configured to evaluate a parameter related to the bonding layer of the evaluation object. The control device compares an actual
(Continued)

value of a frequency characteristic of the elastic wave detected by the elastic wave detection device and a theoretical value of the frequency characteristic of the elastic wave calculated based on a theoretical model related to the evaluation object and evaluates the parameter related to the bonding layer based on a result of the comparison.

10 Claims, 8 Drawing Sheets

(58) Field of Classification Search
CPC ..... G01N 2291/0231; G01N 2291/267; G01N 29/4454
See application file for complete search history.

(56) References Cited

FOREIGN PATENT DOCUMENTS

| CN | 105486747 A | 4/2016 |
|---|---|---|
| CN | 105548364 A | 5/2016 |
| JP | S61254850 A | 11/1986 |
| JP | H095305 A | 1/1997 |
| JP | 2015125008 A | 7/2015 |

OTHER PUBLICATIONS

Transmission of ultrasonic waves at oblique incidence to composite laminates with spring-type interlayer interfaces (Year: 2015).*
Mar. 23, 2016 [retrieval date Feb. 29, 2020], Internet <URL : https:/repository.kulib.kyoto-u.ac.jp/dspace/bitstream/2433/215514/2/dkogk04143.pdf>, in particular, pp. 13, 59-64, non-official translation (Ishii, Yosuke, "Study on evaluation of interlaminar property of carbon fiber reinforced plastic laminates using ultrasonic spectroscopy", Kyoto University Research Information Repository, Kyoto University, [online] ).
Jan. 30, 2019, 26th, pp. 81-82, in particular, pp. 81-82, non-official translation (Nakagawa, Kyoto et al., 'Evaluation of interfacial stiffness in weak adhesive parts of aluminum alloy based on ultrasonic transmission spectra', Lecture proceedings of symposium on non-destructive evaluation with ultrasonic waves (CD-ROM) ).
International Search Report and Written Opinion of International Application No. PCT/JP2020/032172 mailed Nov. 10, 2020.

* cited by examiner

BONDING LAYER EVALUATION SYSTEM AND BONDING LAYER EVALUATION METHOD

RELATED APPLICATIONS

The present application is a National Phase of International Application Number PCT/JP2020/032172 filed Aug. 26, 2020 and claims priority of Japanese Application Number 2019-159852 filed Sep. 2, 2019 and Japanese Application Number 2019-222750 filed Dec. 10, 2019.

FIELD

The present invention relates to a bonding layer evaluation system and a bonding layer evaluation method.

BACKGROUND

A technique of emitting an ultrasonic wave to a specimen including a bonding layer, detecting a reflected wave that is the emitted ultrasonic wave reflected by the bonding layer, and detecting a bonding defect at the bonding layer based on a temporal waveform of the detected reflected wave has been known (refer to Patent Literature 1).

CITATION LIST

Patent Literature

Patent Literature 1: Japanese Patent Application Laid-open No. 2015-125008

SUMMARY

Technical Problem

The technique of Patent Literature 1 can detect a bonding defect at the bonding layer, in other words, a void space between two bonding target bodies sandwiching the bonding layer in the evaluation object without fracturing an evaluation object such as a specimen. However, there has been a problem with incapability of detecting weak bond having no void space between the two bonding target bodies but having a weak bond strength. Furthermore, any conventional technique of detecting weak bond involves fracture of the evaluation object and thus has a problem with incapability of detecting a weak bond without fracturing the evaluation object.

The present invention is performed in view of the above description and intended to provide a bonding layer evaluation system and a bonding layer evaluation method that are capable of evaluating a bonding layer appropriately without fracturing an evaluation object.

Solution to Problem

A bonding layer evaluation system according to the present invention includes an elastic wave generation device configured to generate an elastic wave at an evaluation object including a bonding layer; an elastic wave detection device configured to detect the elastic wave from the evaluation object; and a control device configured to evaluate a parameter related to the bonding layer of the evaluation object, wherein the control device compares an actual value of a frequency characteristic of the elastic wave detected by the elastic wave detection device and a theoretical value of the frequency characteristic of the elastic wave calculated based on a theoretical model related to the evaluation object and evaluates the parameter related to the bonding layer based on a result of the comparison.

A bonding layer evaluation method according to the present invention includes a step of detecting an elastic wave from an evaluation object including a bonding layer; and a step of comparing an actual value of a frequency characteristic of the detected elastic wave and a theoretical value of the frequency characteristic of the elastic wave calculated based on a theoretical model related to the evaluation object, and evaluating a parameter related to the bonding layer based on a result of the comparison.

Advantageous Effects of Invention

According to the present invention, it is possible to evaluate a bonding layer appropriately without fracturing an evaluation object.

DESCRIPTION OF EMBODIMENTS

Embodiments of the present invention will be described below in detail with reference to the accompanying drawings. Note that, the present invention is not limited by the embodiments. Furthermore, components in the embodiments described below include those that can be easily replaced by the skilled person in the art or those identical in effect. Moreover, components described below may be combined as appropriate, and furthermore, when there are a plurality of embodiments, each embodiment may be combined.

First Embodiment

Figure 1:
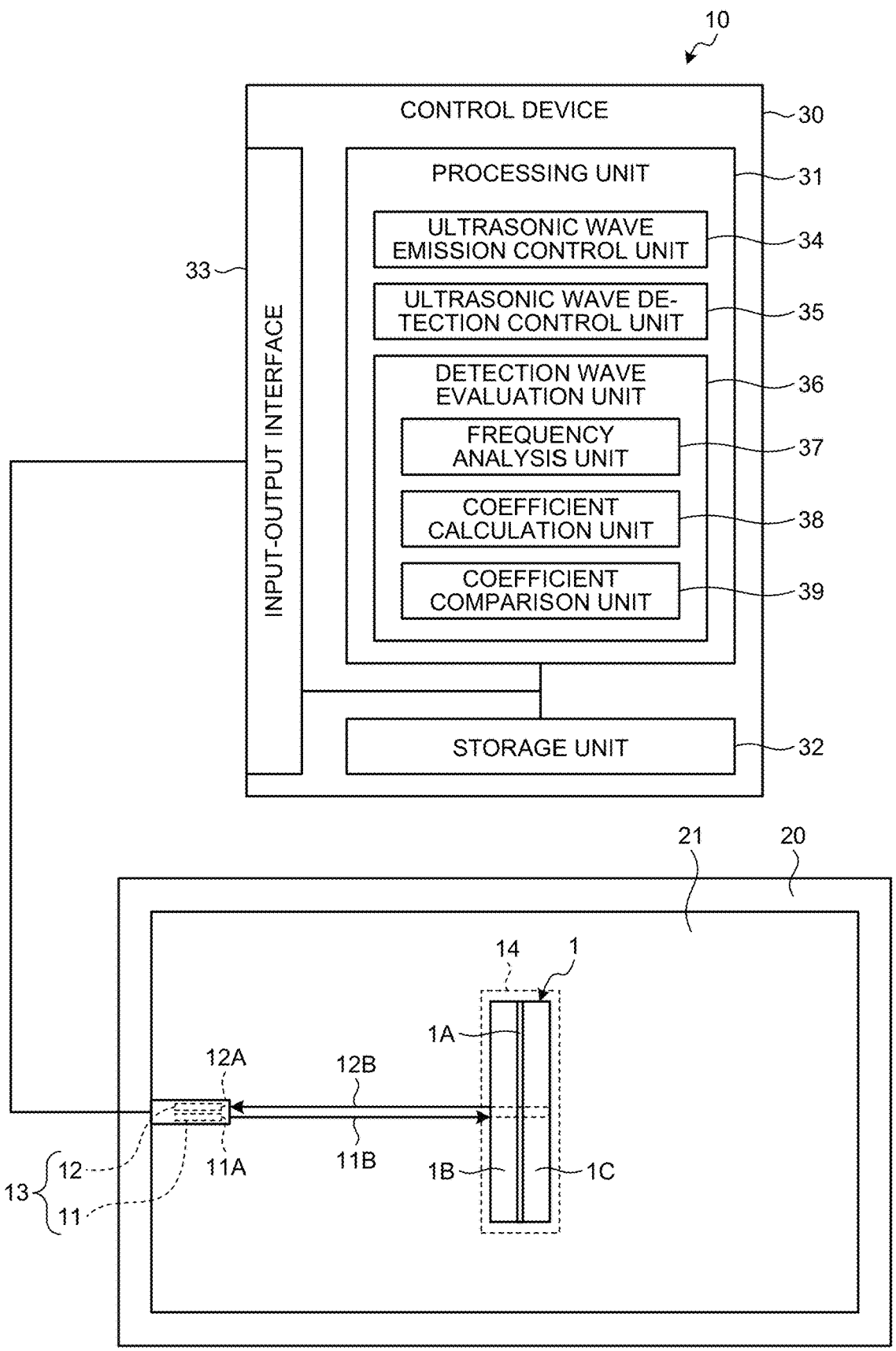
FIG. 1 is a diagram illustrating a specific exemplary configuration of a bonding layer evaluation system according to a first embodiment.

FIG. 1 is a diagram illustrating a specific exemplary configuration of a bonding layer evaluation system according to a first embodiment. This bonding layer evaluation system 10 is a device configured to detect an elastic wave from an evaluation object 1 including a bonding layer 1A that bonds a bonding target body 1B and a bonding target body 1C, and evaluate a parameter related to the bonding layer 1A of the evaluation object 1.

Specifically, the bonding layer evaluation system 10 of the first embodiment emits an ultrasonic wave as the elastic wave toward the evaluation object 1, detects the ultrasonic wave reflected by the evaluation object 1, and evaluates the parameter related to the bonding layer 1A. The parameter related to the bonding layer 1A includes a parameter (hereinafter also referred to as an interface parameter) related to an interface of the bonding layer 1A, a parameter (hereinafter also referred to as a shape parameter) related to the shape of the bonding layer 1A, and a parameter (hereinafter also referred to as a property parameter) related to the properties of the bonding layer 1A. The interface parameter is, for example, the interface stiffness of the bonding layer 1A, and the bonding layer evaluation system 10 evaluates whether the bonding layer 1A has a weak bond (WB) based on the interface parameter. Furthermore, the shape parameter is, for example, the bonding layer thickness, and the bonding layer evaluation system 10 evaluates the thickness of the bonding layer 1A based on the shape parameter. Moreover, the property parameter is, for example, the sound speed, mass density, or elastic modulus of the bonding layer 1A, and the bonding layer evaluation system 10 evaluates the properties of the bonding layer 1A based on the property parameter. Note that, the first embodiment describes a case in which the interface stiffness (a weak bond or not) is evaluated as the parameter related to the bonding layer 1A, but the bonding layer thickness, both the interface stiffness and the bonding layer thickness, or a parameter other than the interface stiffness and the bonding layer thickness may be evaluated as the parameter related to the bonding layer 1A as described above, and the embodiment is not particularly limited to the case.

The evaluation object 1 includes the bonding layer 1A and the two bonding target bodies 1B and 1C bonded to each other by the bonding layer 1A. In the first embodiment, the bonding target body 1B and the bonding target body 1C are aluminum pieces, and the bonding layer 1A is a bonding film that is excellent in high temperature resistance. Note that, the bonding layer 1A, the bonding target body 1B, and the bonding target body 1C are not particularly limited, and a configuration formed by the bonding layer 1A and the bonding target bodies 1B and 1C of any kinds is possible.

As illustrated in FIG. 1, the bonding layer evaluation system 10 includes an ultrasonic wave emission device 11, an ultrasonic wave detection device 12, an installation unit 14, a water tank 20, and a control device 30.

The ultrasonic wave emission device 11 emits, as an emission wave 11B, an ultrasonic wave of 10 MHz, which is used in, for example, typical ultrasonic wave flaw detection, and has an emission surface 11A that emits the ultrasonic wave. The ultrasonic wave detection device 12 has a detection surface 12A that detects a reflected wave 12B that is the ultrasonic wave. In the present embodiment, the ultrasonic wave emission device 11 and the ultrasonic wave detection device 12 are integrated to constitute an ultrasonic wave probe 13, and moreover, the emission surface 11A of the ultrasonic wave emission device 11 and the detection surface 12A of the ultrasonic wave detection device 12 constituting the ultrasonic wave probe 13 may be integrated. Furthermore, the ultrasonic wave emission device 11 and the ultrasonic wave detection device 12 are not limited to the configuration of being integrated to constitute the ultrasonic wave probe 13 but may be separately provided.

The installation unit 14 is a site at which the evaluation object 1 is installed and that is provided as appropriate with a non-illustrated fixation member that fixes the evaluation object 1, a non-illustrated recessed part to which the evaluation object 1 is fitted, and the like. The installation unit 14 is provided at a position facing the emission surface 11A of the ultrasonic wave emission device 11. Furthermore, the installation unit 14 is provided at a position facing the detection surface 12A of the ultrasonic wave detection device 12. Accordingly, the ultrasonic wave probe 13 (the ultrasonic wave emission device 11 and the ultrasonic wave detection device 12) is provided on a side to which the ultrasonic wave from the evaluation object 1 is reflected. Furthermore, the installation unit 14 installs the evaluation object 1 so that the ultrasonic wave is emitted in the perpendicular direction to the interface of the bonding layer 1A of the evaluation object 1 and reflected in the perpendicular direction. Accordingly, in the first embodiment, an incident angle of the emission wave 11B and an emission angle of the reflected wave 12B are both 0° with respect to a bonding interface of the bonding layer 1A of the evaluation object 1.

The water tank 20 accumulates water 21 as an exemplary medium that transfers the ultrasonic wave. For the water tank 20, for example, a rectangular case is used. In the present embodiment, the emission surface 11A of the ultrasonic wave emission device 11, the detection surface 12A of the ultrasonic wave detection device 12, and the installation unit 14 are provided in an accumulation region of the water 21 inside the water tank 20, and part of the ultrasonic wave emission device 11 opposite to the emission surface 11A, part of the ultrasonic wave detection device 12 opposite to the detection surface 12A, and the control device 30 are provided outside the water tank 20. Note that, the water tank 20 is not limited to this configuration and may be any configuration in which at least the path of the emission wave 11B and the path of the reflected wave 12B including the emission surface 11A of the ultrasonic wave emission device 11 and the detection surface 12A of the ultrasonic wave detection device 12 are provided in the accumulation region of the water 21 inside.

The ultrasonic wave emission device 11, the ultrasonic wave detection device 12, the installation unit 14, are the water tank 20 are disposed as described above in the bonding layer evaluation system 10. Accordingly, the emission wave 11B is emitted from the emission surface 11A of the ultrasonic wave emission device 11. Then, the emission wave 11B is emitted to the evaluation object 1 through the water 21 accumulated in the water tank 20. Part of the emission wave 11B is reflected by the evaluation object 1 and becomes the reflected wave 12B, and the reflected wave 12B propagates toward the ultrasonic wave detection device 12. Accordingly, the detection surface 12A of the ultrasonic wave detection device 12 detects the reflected wave 12B.

Furthermore, the emission surface 11A of the ultrasonic wave emission device 11, the detection surface 12A of the ultrasonic wave detection device 12, and the bonding layer 1A of the evaluation object 1 installed in the installation unit 14 are disposed in parallel to one another in the bonding layer evaluation system 10. That is, the evaluation object 1 is disposed in the bonding layer evaluation system 10 so that the ultrasonic wave is emitted in the perpendicular direction to the interface of the bonding layer 1A of the evaluation object 1 and reflected in the perpendicular direction. Accordingly, in the bonding layer evaluation system 10, the emission wave 11B is emitted in the perpendicular direction to the bonding layer 1A from the emission surface 11A of the ultrasonic wave emission device 11. Furthermore, in the bonding layer evaluation system 10, the reflected wave 12B from the evaluation object 1 propagates in a direction right opposite to the emission wave 11B and is detected by the detection surface 12A of the ultrasonic wave detection device 12.

The control device 30 includes a computer system configured to control the bonding layer evaluation system 10. As illustrated in FIG. 1, the control device 30 includes a processing unit 31 including a microprocessor such as a central processing unit (CPU), a storage unit 32 including a non-transitory memory such as a read only memory (ROM) or a storage and including a transitory memory such as a random access memory (RAM), and an input-output interface 33 including an input-output circuit capable of inputting and outputting signals and data.

As illustrated in FIG. 1, the processing unit 31 of the control device 30 includes an ultrasonic wave emission control unit 34, an ultrasonic wave detection control unit 35, and a detection wave evaluation unit 36. The ultrasonic wave emission control unit 34, the ultrasonic wave detection control unit 35, and the detection wave evaluation unit 36 are functional components achieved as the processing unit 31 executes a bonding layer evaluation program for evaluating the bonding layer 1A. Description of detailed functions of the processing unit 31 of the control device 30, in other words, detailed functions of the ultrasonic wave emission control unit 34, the ultrasonic wave detection control unit 35, and the detection wave evaluation unit 36 is provided in detailed description of the configuration of each component as well as detailed description of a bonding layer evaluation method according to an embodiment to be described later.

The ultrasonic wave emission control unit 34 controls the ultrasonic wave emission device 11 and causes the ultrasonic wave emission device 11 to emit the emission wave 11B from the emission surface 11A.

The ultrasonic wave detection control unit 35 controls the ultrasonic wave detection device 12 and causes the ultrasonic wave detection device 12 to detect the reflected wave 12B at the detection surface 12A. In the first embodiment, the ultrasonic wave detection control unit 35 causes the ultrasonic wave detection device 12 to detect a reflected wave that is the ultrasonic wave reflected by the evaluation object 1 including the bonding layer 1A and installed in the installation unit 14. Alternatively, in the first embodiment, the ultrasonic wave detection control unit 35 may cause the ultrasonic wave detection device 12 to detect a reference wave that is the ultrasonic wave reflected by a reflector (reflection body) installed in place of the evaluation object 1 in the installation unit 14.

The detection wave evaluation unit 36 compares an actual value of the reflected wave that the ultrasonic wave detection control unit 35 causes the ultrasonic wave detection device 12 to detect and a theoretical value of the reflected wave calculated based on a theoretical model related to the evaluation object 1, and evaluates whether the bonding layer 1A of the evaluation object 1 forms an appropriate bond (regarded as a perfect bond (PB)), in other words, whether the bonding layer 1A of the evaluation object 1 has a weak bond.

Herein, the theoretical model related to the evaluation object 1 is an analysis model obtained by modeling the evaluation object 1. The detection wave evaluation unit 36 preferably employs, as the theoretical model related to the evaluation object 1, a theoretical model in which the bonding layer 1A is connected by a spring interface, and performs calculation processing by using a stiffness matrix method.

Furthermore, an appropriate bond is defined to be, for example, a bond formed by the bonding layer 1A when a bonding strength obtained by producing a plurality of evaluation objects 1 and performing a predetermined fracture test is included in the highest 5%.

The detection wave evaluation unit 36 includes a frequency analysis unit 37, a coefficient calculation unit 38, and a coefficient comparison unit 39. Similarly to the detection wave evaluation unit 36, the frequency analysis unit 37, the coefficient calculation unit 38, and the coefficient comparison unit 39 are functional components achieved as the processing unit 31 executes a bonding layer evaluation program for evaluating the bonding layer 1A. Description of detailed functions of the detection wave evaluation unit 36, in other words, detailed functions of the frequency analysis unit 37, the coefficient calculation unit 38, and the coefficient comparison unit 39 is provided in detailed description of the configuration of each component as well as detailed description of a bonding layer evaluation method according to an embodiment to be described later.

The frequency analysis unit 37 performs frequency analysis of each of the reflected wave 12B and a reference wave that is the ultrasonic wave reflected by a reflection body. More specifically, the frequency analysis unit 37 acquires amplitude spectra by providing fast Fourier transform on each of the reflected wave 12B and the reference wave that are temporal functions.

The coefficient calculation unit 38 calculates an intensity ratio between the amplitude spectrum of the reflected wave 12B and the amplitude spectrum of the reference wave based on the amplitude spectrum of the reflected wave 12B and the amplitude spectrum of the reference wave obtained by the frequency analysis unit 37, and calculates the actual value of a reflection coefficient R as the frequency characteristic based on the intensity ratio. More specifically, the coefficient calculation unit 38 acquires a frequency function of the actual value of the reflection coefficient R by dividing the intensity of the amplitude spectrum of the reflected wave 12B by the intensity of the amplitude spectrum of the reference wave for each frequency f. Note that, according to its properties, the reflection coefficient R is a coefficient that takes a value from zero to one inclusive, taking one when the ultrasonic wave is completely not transmitted (when the ultrasonic wave is all reflected), and taking zero when the ultrasonic wave is completely transmitted (when the ultrasonic wave is completely not reflected). Note that, the reflection coefficient R is equal to or smaller than one in theory, but can take a value equal to or larger than one in measurement.

The coefficient comparison unit 39 compares the actual value of the reflection coefficient R calculated by the coefficient calculation unit 38 and the theoretical value of the reflection coefficient R calculated based on the theoretical model, then evaluates whether the bonding layer 1A has a weak bond.

Specifically, since the detected ultrasonic wave is the reflected wave 12B, the coefficient comparison unit 39 compares a frequency f at which the actual value of the reflection coefficient R calculated by the coefficient calculation unit 38 has a local minimum and a frequency f at which the theoretical value of the reflection coefficient R calculated based on the theoretical model has a local minimum when it is assumed that the bonding layer 1A has no weak bond but has an appropriate bond. The coefficient comparison unit 39 evaluates that the bonding layer 1A has no weak bond when the frequencies match within the range of predetermined error and evaluates that the bonding layer 1A has a weak bond when the frequencies have a significant difference beyond the predetermined error.

Furthermore, hereinafter, as for each of the frequency function of the actual value of the reflection coefficient R and the frequency function of the theoretical value of the reflection coefficient R, the frequency f at which the value thereof has a local minimum is referred to as a notch frequency. Typically, a plurality of notch frequencies exist for each of the frequency function of the actual value of the reflection coefficient R and the frequency function of the theoretical value of the reflection coefficient R.

The reason for using the notch frequency of the reflection coefficient R when the frequency function of the actual value of the reflection coefficient R and the frequency function of the theoretical value of the reflection coefficient R are compared and contrasted is such that a difference beyond the predetermined error in the absolute value of the reflection coefficient R may occur between the actual value and the theoretical value due to use of the theoretical model that has a reduced calculation amount by completely not considering absorption and scattering of the ultrasonic wave that may actually occur at the evaluation object 1 but a difference beyond the predetermined error in the notch frequency of the reflection coefficient R does not occur between the actual value and the theoretical value.

The notch frequency of the actual value of the reflection coefficient R has a tendency that part thereof is constant irrespective of the interface parameter of the bonding layer 1A and the other part changes with the interface parameter of the bonding layer 1A in a one-to-one relation. Furthermore, the notch frequency of the theoretical value of the reflection coefficient R has, for the interface parameter related to the bonding layer 1A, a tendency same as the tendency that the notch frequency of the actual value of the reflection coefficient R has for the interface parameter of the bonding layer 1A. Thus, the predetermined error that may occur to the reflection coefficient R can be appropriately set in advance based on a difference that may occur in the notch frequency that is constant irrespective of the interface parameter of the bonding layer 1A. The interface parameter related to the bonding layer 1A is a parameter of a spring interface when the theoretical model in which connection is made by the spring interface is employed, and quantitatively evaluates the bonding strength of the bonding layer 1A. Note that, although the interface parameter is applied as the parameter related to the bonding layer 1A in the first embodiment, the shape parameter related to the bonding layer thickness of the bonding layer 1A may be applied when the bonding layer thickness of the bonding layer 1A is evaluated. In this case, the shape parameter related to a bonding layer thickness $h_{ad}$ is employed (set) in the theoretical model. Alternatively, the interface parameter, the shape parameter, and the property parameter described above may be all applied as the parameter related to the bonding layer 1A. In this case, for example, parameters related to the sound speed of the bonding layer 1A, the mass density of the bonding layer 1A, and the elastic modulus of the bonding layer 1A are employed as the property parameter and applied to the theoretical model.

Furthermore, the coefficient comparison unit 39 calculates, as a parameter value of the parameter related to the bonding layer 1A of the evaluation object 1 used in the evaluation, a parameter value of the parameter related to the bonding layer 1A in the theoretical model when the notch frequency f of the actual value of the reflection coefficient R calculated by the coefficient calculation unit 38 matches the notch frequency f of the theoretical value of the reflection coefficient R calculated based on the theoretical model within the range of predetermined error.

Furthermore, the coefficient comparison unit 39 can more efficiently perform processing by combining those described above, and can derive the parameter related to the bonding layer 1A by changing the parameter related to the bonding layer 1A in the theoretical model so that the notch frequency of the theoretical value of the reflection coefficient R is fitted to the notch frequency of the actual value of the reflection coefficient R and can evaluate that the bonding layer 1A has a weak bond if the parameter related to the bonding layer 1A is lower than the parameter related to the bonding layer 1A when an appropriate bond is formed.

The storage unit 32 of the control device 30 stores various kinds of data used in the processing unit 31 of the control device 30. Specifically, the storage unit 32 of the control device 30 stores, for example, data related to shapes such as the materials and thicknesses of the bonding layer 1A, the bonding target body 1B, and the bonding target body 1C as data related to the evaluation object 1, data related to the frequency of the ultrasonic wave of the emission wave 11B from the ultrasonic wave emission device 11 used by the ultrasonic wave emission control unit 34 and an emission condition for a perpendicular line of the bonding layer 1A, data related to a detection condition for the reflected wave 12B by the ultrasonic wave detection device 12 used by the ultrasonic wave detection control unit 35, data related to fast Fourier transform processing used by the frequency analysis unit 37 of the detection wave evaluation unit 36, data related to derivation processing of the frequency function of the actual value of the reflection coefficient R used by the coefficient calculation unit 38 of the detection wave evaluation unit 36, data related to the theoretical model used by the coefficient comparison unit 39 of the detection wave evaluation unit 36, and data related to comparison processing of the actual value of the reflection coefficient R and the theoretical value of the reflection coefficient R used by the coefficient comparison unit 39 of the detection wave evaluation unit 36. Note that, data related to shapes such as the thicknesses of the bonding layer 1A, the bonding target body 1B, and the bonding target body 1C may be calculated as the parameter related to the bonding layer 1A.

Furthermore, the storage unit 32 of the control device 30 can store various kinds of data acquired by the processing unit 31 of the control device 30. Specifically, the storage unit 32 of the control device 30 can store, for example, data of detection of the reflected wave 12B by the ultrasonic wave detection device 12 and measurement data of the reference wave, which are acquired by the ultrasonic wave detection control unit 35, data of a frequency function of the reflected wave 12B and data of a frequency function of the reference wave, which are acquired by the frequency analysis unit 37 of the detection wave evaluation unit 36, data of the frequency function of the actual value of the reflection coefficient R, which is acquired by the coefficient calculation unit 38 of the detection wave evaluation unit 36, data of the frequency function of the theoretical value of the reflection coefficient R, which is calculated by the coefficient comparison unit 39 of the detection wave evaluation unit 36, and the parameter related to the bonding layer 1A of the evaluation object 1, which is calculated by the coefficient comparison unit 39 of the detection wave evaluation unit 36.

The ultrasonic wave probe 13 constituted by the ultrasonic wave emission device 11 and the ultrasonic wave detection device 12 is connected to the input-output interface 33 of the control device 30. The control device 30 controls, through the input-output interface 33, the ultrasonic wave probe 13 including the ultrasonic wave emission device 11 and the ultrasonic wave detection device 12, and acquires data of detection of the reflected wave 12B by the ultrasonic wave detection device 12. In addition, a non-illustrated input device may be connected to the input-output interface 33 of the control device 30. The control device 30 can receive, through the input-output interface 33, inputting of various kinds of information used for processing by the processing unit 31 from the input device. In addition, a non-illustrated display device may be connected to the input-output interface 33 of the control device 30. Various kinds of information obtained through processing by the processing unit 31 can be output and displayed as characters, images, moving images, and the like on the display device.

Figure 2:
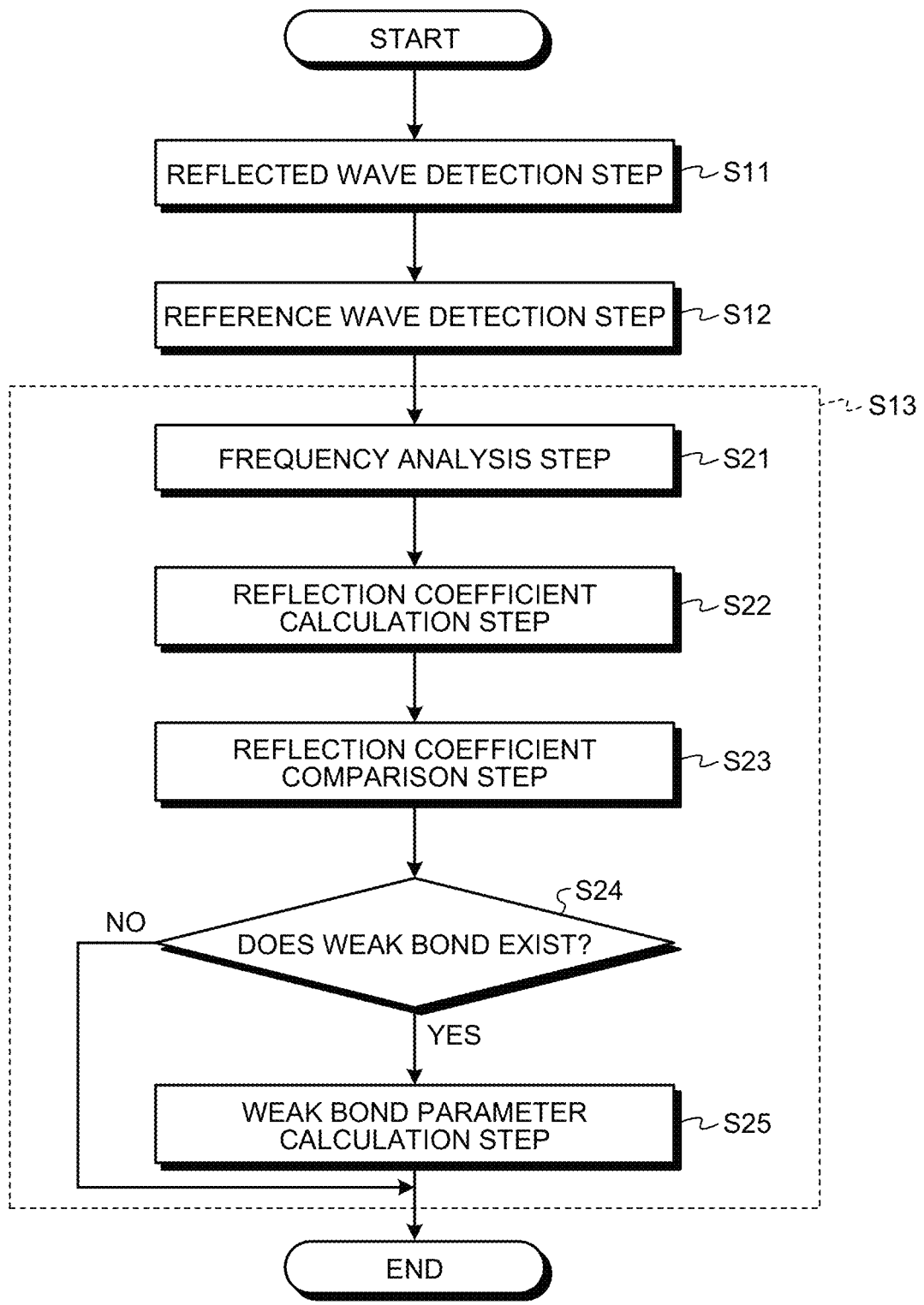
FIG. 2 is a flowchart of a bonding layer evaluation method according to the first embodiment.

Next, a bonding layer evaluation method by the bonding layer evaluation system 10 will be described with reference to FIG. 2. FIG. 2 is a flowchart of the bonding layer evaluation method according to the first embodiment. The bonding layer evaluation method according to the embodiment executed by the bonding layer evaluation system 10 will be described below together with detailed functions of the ultrasonic wave emission control unit 34, the ultrasonic wave detection control unit 35, and the detection wave evaluation unit 36 of the processing unit 31 and detailed functions of the frequency analysis unit 37, the coefficient calculation unit 38, and the coefficient comparison unit 39 of the detection wave evaluation unit 36 in the bonding layer evaluation system 10.

As illustrated in FIG. 2, the bonding layer evaluation method according to the first embodiment includes a reflected wave detection step S11, a reference wave detection step S12, and a detection wave evaluation step S13.

The reflected wave detection step S11 is a step at which the ultrasonic wave is emitted to the evaluation object 1 including the bonding layer 1A and the actual value of the reflected wave 12B that is the ultrasonic wave reflected by the evaluation object 1 is detected.

Specifically, first at the reflected wave detection step S11, as illustrated in FIG. 1, a state in which the evaluation object 1 including the bonding layer 1A is installed in the installation unit 14 is formed. In this state, subsequently at the reflected wave detection step S11, the ultrasonic wave emission control unit 34 controls the ultrasonic wave emission device 11 and causes the ultrasonic wave emission device 11 to emit the emission wave 11B from the emission surface 11A toward the evaluation object 1 installed in the installation unit 14. Then at the reflected wave detection step S11, the ultrasonic wave detection control unit 35 controls the ultrasonic wave detection device 12 and causes the ultrasonic wave detection device 12 to detect the reflected wave 12B at the detection surface 12A. Accordingly, at the reflected wave detection step S11, the ultrasonic wave detection control unit 35 causes the ultrasonic wave detection device 12 to detect the actual value of the reflected wave 12B from the evaluation object 1 including the bonding layer 1A.

The reference wave detection step S12 is a step at which the actual value of the reference wave that is the ultrasonic wave reflected by the reflection body installed in place of the evaluation object 1 is detected.

Specifically, first at the reference wave detection step S12, a state in which the reflection body is installed in the installation unit 14 in place of the evaluation object 1 is formed. In this state, subsequently at the reference wave detection step S12, at the reference wave detection step S12, the ultrasonic wave emission control unit 34 controls the ultrasonic wave emission device 11 and causes the ultrasonic wave emission device 11 to emit the emission wave 11B from the emission surface 11A toward the reflection body installed in the installation unit 14. Then at the reference wave detection step S12, the ultrasonic wave detection control unit 35 controls the ultrasonic wave detection device 12 and causes the ultrasonic wave detection device 12 to detect the reflected wave 12B at the detection surface 12A. Accordingly, at the reference wave detection step S12, the ultrasonic wave detection control unit 35 causes the ultrasonic wave detection device 12 to detect the actual value of the reference wave that is the ultrasonic wave reflected by the reflection body.

Note that, in a case in which the actual value of the reference wave is previously detected under a condition that the positional relation between the ultrasonic wave emission device 11 and the ultrasonic wave detection device 12, the water 21 accumulated in the water tank 20, and the like are same, execution of the reference wave detection step S12 may be omitted and the previously detected actual value of the reference wave may be used again.

The detection wave evaluation step S13 is a step at which the actual value of the reflected wave 12B detected at the reflected wave detection step S11 and the theoretical value of the reflected wave 12B calculated based on the theoretical model related to the evaluation object 1 are compared and whether the bonding layer 1A has a weak bond is evaluated. More specifically, as illustrated in FIG. 2, the detection wave evaluation step S13 includes a frequency analysis step S21, a reflection coefficient calculation step S22, a reflection coefficient comparison step S23, a weak bond existence determination step S24, and a weak bond parameter calculation step S25.

The frequency analysis step S21 is a step at which frequency analysis is performed on each of the reflected wave 12B obtained at the reflected wave detection step S11 and the reference wave obtained at the current or previous reference wave detection step S12.

Specifically, the frequency analysis step S21 is a step at which the frequency analysis unit 37 acquires a frequency function of the intensity of an amplitude spectrum by performing fast Fourier transform on each of the reflected wave 12B and the reference wave that are temporal functions.

The reflection coefficient calculation step S22 is a step at which the actual value of the reflection coefficient R that is a parameter related to the reflected wave 12B reflected by the evaluation object 1 is calculated based on the intensity ratio between the amplitude spectrum of the reflected wave 12B and the amplitude spectrum of the reference wave obtained at the frequency analysis step S21.

Specifically, at the reflection coefficient calculation step S22, the coefficient calculation unit 38 acquires, for each frequency f, the frequency function of the actual value of the reflection coefficient R by dividing the intensity of the amplitude spectrum of the reflected wave 12B by the intensity of the amplitude spectrum of the reference wave.

Figure 3:
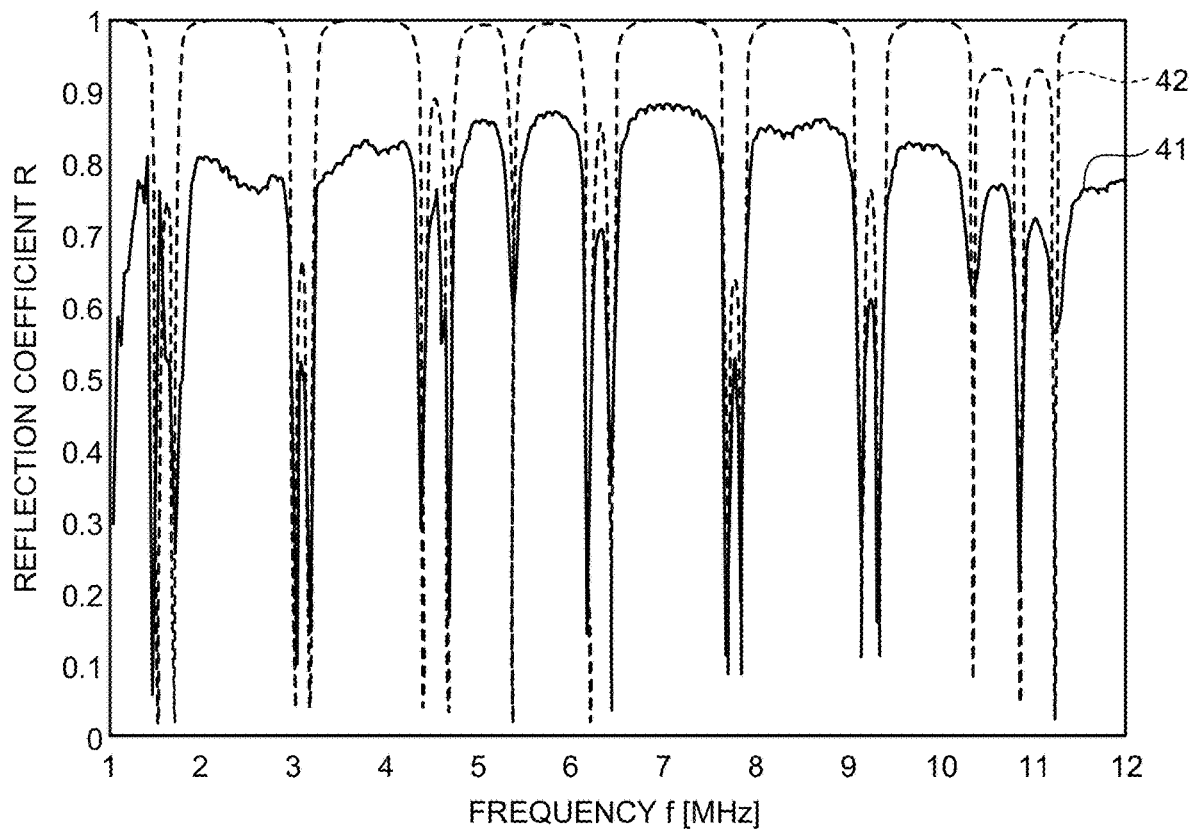
FIG. 3 is an exemplary graph for explaining a detection wave evaluation step in FIG. 2.

FIG. 3 is an exemplary graph for description of the detection wave evaluation step in FIG. 2. The graph in FIG. 3 is a two-dimensional graph in which the horizontal axis represents the frequency f [in the unit of MHz] and the vertical axis represents the reflection coefficient R. The graph in FIG. 3 plots the actual value of the reflection coefficient R of the reflected wave 12B when divided by the intensity of the amplitude spectrum of the reference wave. At the reflection coefficient calculation step S22, the coefficient calculation unit 38 acquires, for example, a frequency function curve 41 of the actual value of the reflection coefficient R, which is illustrated with a solid line in FIG. 3.

The reflection coefficient comparison step S23 is a step at which the actual value of the reflection coefficient R calculated at the reflection coefficient calculation step S22 and theoretical value of the reflection coefficient R calculated based on the theoretical model are compared and whether the bonding layer 1A has a weak bond is evaluated.

Figure 4:
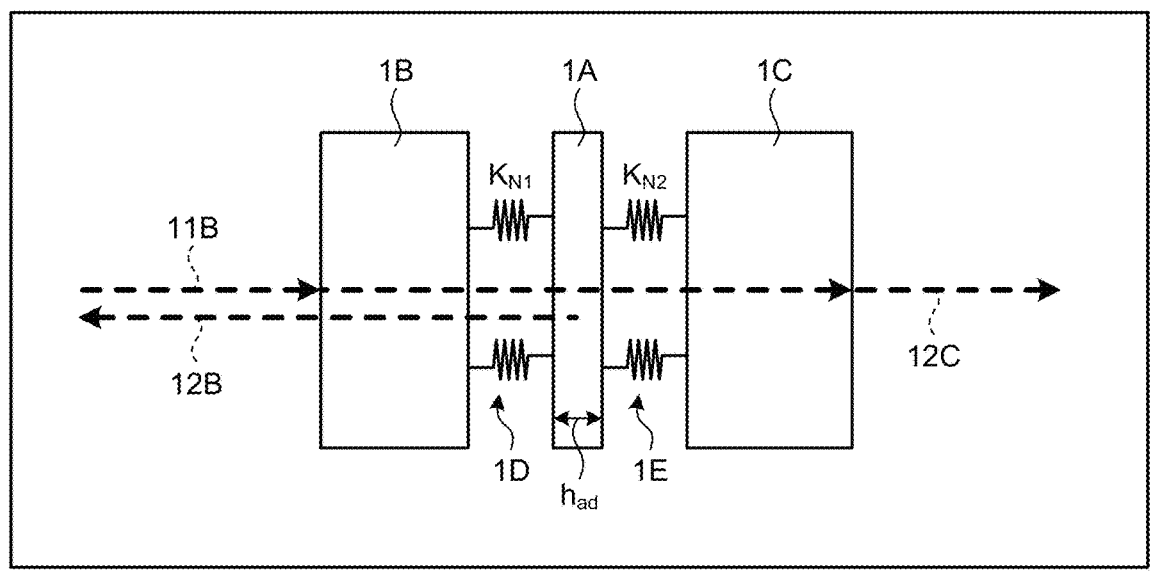
FIG. 4 is an explanatory diagram illustrating an exemplary theoretical model according to the first embodiment.

FIG. 4 is an explanatory diagram illustrating an exemplary theoretical model according to the first embodiment. The theoretical model used to calculate the theoretical value of the reflection coefficient R used at the reflection coefficient comparison step S23 will be described below with reference to FIG. 4.

In the theoretical model used by the coefficient comparison unit 39 at the reflection coefficient comparison step S23, as illustrated in FIG. 4, the evaluation object 1 is an object in which a spring interface (first spring interface) 1D is provided at the interface between the bonding target body 1B and the bonding layer 1A, a spring interface (second spring interface) 1E is provided at the interface between the bonding layer 1A and the bonding target body 1C, and the bonding layer 1A is connected by the two spring interfaces 1D and 1E. In the theoretical model, the bonding interface stiffness at the spring interface 1D is set with a spring constant $K_{N1}$ [in the unit of MPa/nm], and the bonding interface stiffness at the spring interface 1E is set with a spring constant $K_{N2}$ [in the unit of MPa/nm]. Note that, the spring constants $K_{N1}$ and $K_{N2}$ are each a parameter having a property that the value thereof directly indicates the bonding interface stiffness. Furthermore, the spring constants $K_{N1}$ and $K_{N2}$ are set so that the bonding interface stiffness at each of the spring interfaces 1D and 1E is a stiffness component in the perpendicular direction. In the first embodiment, since such a theoretical model is employed, whether the bonding layer 1A has a weak bond can be evaluated with respect to the reflected wave 12B of the ultrasonic wave by using a calculation method that sets interface stresses at both surfaces of the bonding layer 1A to which a factor of a weak bond is likely to actually occur and performs stiffness analysis, the method being highly appropriate for the first embodiment, and thus weak bond detection backed up by the theoretical model and calculation method based on reality can be executed.

Furthermore, at the reflection coefficient comparison step S23, with taken into account the fact that fracture often occurs to the interface between the bonding layer 1A and the bonding target body 1B or the interface between the bonding layer 1A and the bonding target body 1C when the actual evaluation object 1 including the bonding layer 1A undergoes delamination fracture, the coefficient comparison unit 39 uses the theoretical model by assuming that an appropriate bond is formed with the spring constant $K_{N1}$ as one of the spring constants $K_{N1}$ and $K_{N2}$ and an appropriate bond or a weak bond is formed with the other spring constant $K_{N2}$. That is, the one spring constant $K_{N1}$ is set as a spring constant with which a bond is determined as an appropriate bond and is a fixed value, while the other spring constant $K_{N2}$ is set as a spring constant with which a bond is determined as an appropriate bond or a weak bond and is a variable value. Note that, in the present invention, the method of handling the spring constants $K_{N1}$ and $K_{N2}$ in the theoretical model is not limited to this method, and for example, the other spring constant $K_{N2}$ among the spring constants $K_{N1}$ and $K_{N2}$ may be handled as a spring constant with which an appropriate bond is formed and the one spring constant $K_{N1}$ may be handled as a spring constant with which an appropriate bond or a weak bond is formed, or the spring constants $K_{N1}$ and $K_{N2}$ may be handled as the same value and as spring constants with which an appropriate bond or a weak bond is formed.

Furthermore, the method of providing, for example, the spring constants $K_{N1}$ and $K_{N2}$ in the theoretical model is not limited to the above-described method but may be changed as appropriate in accordance with the properties of the evaluation object 1. For example, a theoretical model in which a spring interface is provided at only one of the interface between the bonding target body 1B and the bonding layer 1A and the interface between the bonding layer 1A and the bonding target body 1C, and the bonding layer 1A is connected by the one spring interface may be used.

First at the reflection coefficient comparison step S23, the coefficient comparison unit 39 acquires information of the densities and thicknesses of the bonding layer 1A, the bonding target body 1B, and the bonding target body 1C and information of the frequency of the ultrasonic wave as the emission wave 11B from the ultrasonic wave emission device 11, which are to be input to the above-described theoretical model, from the storage unit 32.

Subsequently at the reflection coefficient comparison step S23, the coefficient comparison unit 39 inputs, to the above-described theoretical model, the information of the densities and thicknesses of the bonding layer 1A, the bonding target body 1B, and the bonding target body 1C and the information of the frequency of the ultrasonic wave as the emission wave 11B, and derives a relational expression that holds among the spring constants $K_{N1}$ and $K_{N2}$, the frequency f, and the reflection coefficient R by using the stiffness matrix method.

Then at the reflection coefficient comparison step S23, by using the relational expression that is derived by using the theoretical model and holds among the spring constants $K_{N1}$ and $K_{N2}$, the frequency f, and the reflection coefficient R, the coefficient comparison unit 39 inputs a value when an appropriate bond is formed into the spring constant $K_{N1}$ and fixes the value, sequentially substitutes the frequency f in a range set in advance, and sequentially substitutes the spring constant $K_{N1}$ in a range from zero to the set value of the spring constant $K_{N1}$ inclusive, thereby calculating the theoretical value of the reflection coefficient R for each frequency f in the range set in advance and for each value of the spring constant $K_{N2}$ in the range from zero to the set value of the spring constant $K_{N1}$ inclusive.

Herein, for the value of the spring constant $K_{N1}$ when an appropriate bond is formed, the values of the spring constants $K_{N1}$ and $K_{N2}$ are assumed to be equal. In this case, it is preferable to employ the values of the spring constants $K_{N1}$ and $K_{N2}$ when the frequency function of the actual value of the reflection coefficient R and the frequency function of the theoretical value of the reflection coefficient R with which the notch frequencies of the reflection coefficient R match are calculated for the evaluation object 1 in which an appropriate bond is thought to be formed based on another strength test or the like.

Figure 5:
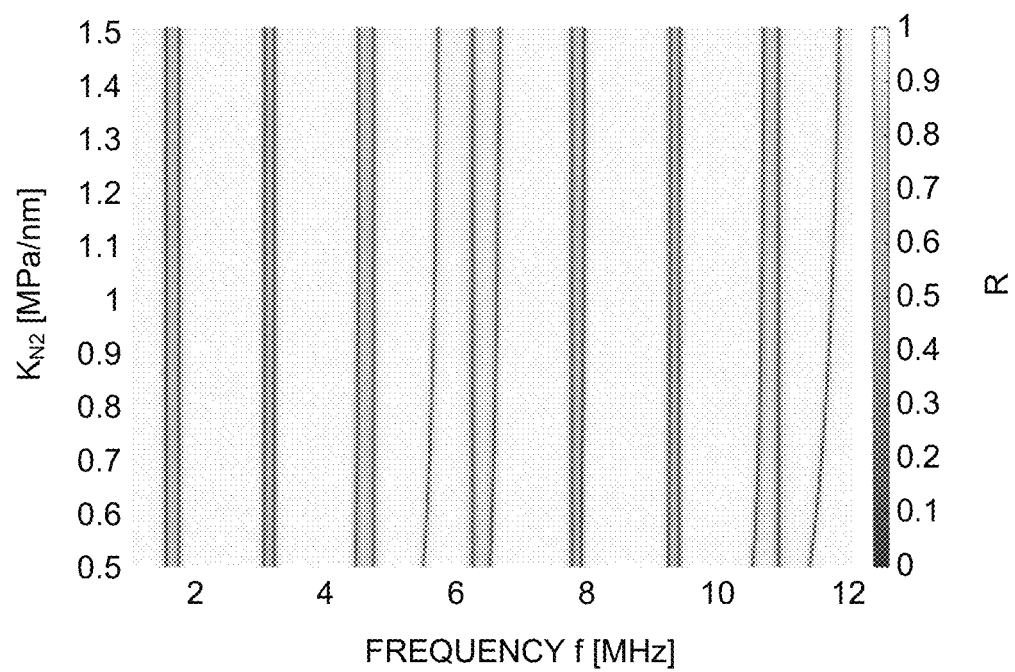
FIG. 5 is a graph illustrating an exemplary theoretical value of a coefficient calculated by using the theoretical model.

FIG. 5 is a graph illustrating an exemplary theoretical value of the reflection coefficient R calculated by using the theoretical model. The graph in FIG. 5 is a three-dimensional graph in which the horizontal axis represents the frequency f [in the unit of MHz], the vertical axis represents the spring constant $K_{N2}$, and the grayscale represents the reflection coefficient R [in the unit of MPa/nm]. In FIG. 5, a section that appears upon selection of an optional value of the spring constant $K_{N2}$ and cutting in parallel to the horizontal axis is a two-dimensional graph in which the horizontal axis represents the frequency f [in the unit of Hz] and the vertical axis represents the reflection coefficient R and that can be compared with the frequency function curve 41 of the actual value of the reflection coefficient R. At the reflection coefficient comparison step S23, the coefficient comparison unit 39 acquires a bundle of frequency functions of the theoretical value of the reflection coefficient R for respective values of the spring constant $K_{N2}$ as illustrated in the three-dimensional graph in FIG. 5.

At the reflection coefficient comparison step S23, the coefficient comparison unit 39 compares the frequency function of the actual value of the reflection coefficient R, which is acquired at the reflection coefficient calculation step S22, and the frequency function of the theoretical value of the reflection coefficient R when it is assumed that an appropriate bond is formed and the spring constant $K_{N2}$ is equal to the spring constant $K_{N1}$ among the bundle of frequency functions of the theoretical value of the reflection coefficient R for respective values of the spring constant $K_{N2}$, which are acquired through the processing so far at the reflection coefficient comparison step S23. Then at the reflection coefficient comparison step S23, the coefficient comparison unit 39 evaluates that the bonding layer 1A has no weak bond when the plurality of notch frequencies each match within the range of predetermined error between the two frequency functions of the reflection coefficient R, or evaluates that the bonding layer 1A has a weak bond when any notch frequency has a significant difference beyond the predetermined error between the two frequency functions of the reflection coefficient R.

At the reflection coefficient comparison step S23, for example, when the frequency function curve 41 of the actual value of the reflection coefficient R in FIG. 3 is acquired by the coefficient calculation unit 38 at the reflection coefficient calculation step S22, the plurality of notch frequencies each match within the range of predetermined error between the frequency function curve 41 of the actual value of the reflection coefficient R in FIG. 3 and a frequency function curve 42 of the theoretical value of the reflection coefficient R, which is illustrated with a dashed line in FIG. 3 when it is assumed that an appropriate bond is formed and the spring constant $K_{N2}$ is equal to the spring constant $K_{N1}$, and thus the coefficient comparison unit 39 evaluates that the bonding layer 1A of the evaluation object 1 used to detect the reflected wave 12B in FIG. 3 has no weak bond.

At the weak bond existence determination step S24, when the coefficient comparison unit 39 evaluates that the bonding layer 1A has no weak bond at the reflection coefficient comparison step S23 in the case of FIG. 3, it is determined that no weak bond exists (No at the weak bond existence determination step S24), and the bonding layer evaluation method according to the first embodiment is ended without executing the weak bond parameter calculation step S25. On the other hand, the weak bond existence determination step S24 is a step at which, when the coefficient comparison unit 39 evaluates that the bonding layer 1A has a weak bond at the reflection coefficient comparison step S23, it is determined that a weak bond exists (Yes at the weak bond existence determination step S24) and the processing is advanced to the weak bond parameter calculation step S25.

The weak bond parameter calculation step S25 is a step at which a parameter related to the weak bond included in the bonding layer 1A is calculated. Specifically, at the weak bond parameter calculation step S25, the coefficient comparison unit 39 calculates, as the parameter related to the bonding layer 1A of the evaluation object 1 used in the evaluation, the value of the spring constant $K_{N2}$ when notch frequencies in the frequency function of the actual value of the reflection coefficient R, which is acquired at the reflection coefficient calculation step S22, and the plurality of notch frequencies in the frequency function of the theoretical value of the reflection coefficient R, which is acquired at the reflection coefficient comparison step S23, respectively match within the range of predetermined miscalculation.

As illustrated in FIG. 5, part of the notch frequencies in the frequency function of the actual value of the reflection coefficient R, which is acquired at the reflection coefficient calculation step S22, changes with the value of the spring constant $K_{N2}$ when the theoretical model described in the first embodiment is used. Furthermore, as for a peak of change of each notch frequency with the value of the spring constant $K_{N2}$, it is indicated that the value of the spring constant $K_{N2}$ and the notch frequency have a one-to-one relation as illustrated in FIG. 5. Accordingly, at the weak bond parameter calculation step S25, the coefficient comparison unit 39 can uniquely calculate the value of the spring constant $K_{N2}$ based on the notch frequency in the frequency function of the actual value of the reflection coefficient R by using the frequency function of the actual value of the reflection coefficient R, which is acquired at the reflection coefficient calculation step S22.

At the weak bond parameter calculation step S25, the coefficient comparison unit 39 changes the spring constant $K_{N2}$ so that the notch frequency of the frequency function curve of the theoretical value of the reflection coefficient R is fitted to the notch frequency of the frequency function curve of the actual value of the reflection coefficient R with which a weak bond is evaluated. Accordingly, at the weak bond parameter calculation step S25, the notch frequency of the frequency function curve of the actual value of the reflection coefficient R with which a weak bond is evaluated and the notch frequency of the frequency function curve of the theoretical value of the reflection coefficient R match within the range of predetermined error for each of the plurality of notch frequencies when the ratio of the spring constant $K_{N2}$ relative to the spring constant $K_{N1}$ is equal to a predetermined ratio. At the weak bond parameter calculation step S25, the predetermined ratio of the spring constant $K_{N2}$ relative to the spring constant $K_{N1}$ when the notch frequency of the frequency function curve of the actual value of the reflection coefficient R and the notch frequency of the frequency function curve of the theoretical value of the reflection coefficient R match within the range of predetermined error is calculated as the bonding strength of a weak bond with reference to that of an appropriate bond.

Note that, in the first embodiment, after a weak bond of the bonding layer 1A is evaluated, the parameter related to the bonding layer 1A is acquired when a weak bond exists as described above, but the present invention is not limited to this configuration. Efficient processing can be executed at the reflection coefficient comparison step S23 by including the above-described processing at the weak bond existence determination step S24 and the weak bond parameter calculation step S25 in effect. In this case, specifically, at the reflection coefficient comparison step S23, the coefficient comparison unit 39 derives the spring constant $K_{N2}$ as the parameter related to the bonding layer 1A by changing the spring constant $K_{N2}$ as the parameter related to the bonding layer 1A in the theoretical model so that the notch frequency of the theoretical value of the reflection coefficient R is fitted to the notch frequency of the actual value of the reflection coefficient R, and evaluates that the bonding layer 1A has a weak bond when the spring constant $K_{N2}$ as the parameter related to the bonding layer 1A is lower than the spring constant $K_{N1}$ as a parameter related to bonding when an appropriate bond is formed.

Furthermore, distribution of weak bond existence at the bonding layer 1A in the in-plane direction and distribution of bonding strength at the bonding layer 1A in the in-plane direction can be calculated by performing the bonding layer evaluation method according to the embodiment, including the reflected wave detection step S11, the reference wave detection step S12, and the detection wave evaluation step S13, at a plurality of positions in the in-plane direction of the bonding layer 1A of the evaluation object 1.

As described above, according to the first embodiment, it is possible to evaluate whether the bonding layer 1A has a weak bond by using the reflected wave 12B of the ultrasonic wave, and thus it is possible to detect a weak bond without fracturing the evaluation object 1. Specifically, it is possible to detect a weak bond by detecting the ultrasonic wave to be the reflected wave 12B by using the ultrasonic wave probe 13 on one side of the evaluation object 1.

Furthermore, according to the first embodiment, the actual value of the reflection coefficient R is calculated based on the intensity ratio between the amplitude spectrum of the reflected wave 12B and the amplitude spectrum of the reference wave, which is obtained through frequency analysis of each of the reflected wave 12B and the reference wave, and whether the bonding layer 1A has a weak bond is evaluated by comparing the actual value of the reflection coefficient R with the theoretical value of the reflection coefficient R calculated based on the theoretical model. Accordingly, a coefficient that significantly expresses the bonding property of the bonding layer 1A is used for the reflected wave 12B of the ultrasonic wave, and thus whether the bonding layer 1A has a weak bond can be evaluated at high accuracy.

Furthermore, according to the first embodiment, the detection wave evaluation unit 36 changes a spring constant $K_{N2}$ as the parameter related to the bonding layer 1A in the theoretical model so that the notch frequency of the theoretical value of the reflection coefficient R is fitted to the notch frequency of the actual value of the reflection coefficient R. Accordingly, it is possible to derive the spring constant $K_{N2}$ as the parameter related to the bonding layer 1A and evaluate that the bonding layer 1A has a weak bond when the spring constant $K_{N2}$ is lower than the spring constant $K_{N1}$ as a parameter related to bonding when an appropriate bond is formed. Accordingly, whether the bonding layer 1A has a weak bond can be efficiently evaluated at higher accuracy.

Furthermore, according to the first embodiment, a theoretical model in which the bonding layer 1A is connected by the two spring interfaces 1D and 1E is employed as the theoretical model related to the evaluation object 1, and the theoretical value of the reflection coefficient R or the like are calculated by using the stiffness matrix method. Accordingly, whether the bonding layer 1A has a weak bond can be evaluated for the reflected wave 12B of the ultrasonic wave by using a highly appropriate theoretical model and a highly appropriate calculation method in which stiffness analysis is performed by setting an interface stress to an interface to which a factor of a weak bond is likely to actually occur, and thus weak bond detection backed up by the theoretical model and calculation method based on reality can be executed.

Note that, in the first embodiment, the ultrasonic wave probe 13 that emits the ultrasonic wave toward the evaluation object 1 and detects the ultrasonic wave reflected by the evaluation object 1 is used as the ultrasonic wave emission device 11 and the ultrasonic wave detection device 12, but the present invention is not limited thereto. For example, the ultrasonic wave emission device 11 and the ultrasonic wave detection device 12 may excite the evaluation object 1 and detect an elastic wave generated from the evaluation object. As a device that excites the evaluation object 1, for example, a device that excites the evaluation object 1 with an acoustic field and an elastic wave field, an electromagnetic wave, or an electromagnetic field such as an electric field or a magnetic field by using an ultrasonic wave transducer, a laser, an EMAT, and the like, may be used.

Furthermore, in the first embodiment, the bonding interface stiffness based on the spring constants $K_{N1}$ and $K_{N2}$ is calculated as the parameter related to the bonding layer 1A, but it is possible to calculate the bonding layer thickness $h_{ad}$ by using the same method by incorporating the bonding layer thickness $h_{ad}$ as the parameter related to the bonding layer 1A in the theoretical model. Similarly, the property parameter may be incorporated as the parameter related to the bonding layer 1A in addition to the interface stiffness as the interface parameter and the bonding layer thickness $h_{ad}$ as the shape parameter described above and may be calculated by using the same method.

Furthermore, in the first embodiment, the amplitude spectrum of the notch frequency is applied as the frequency characteristic, but the present invention is not particularly limited thereto. The actual value of the frequency characteristic of the reflected wave 12B detected by the ultrasonic wave detection device 12 and the theoretical value of the frequency characteristic of the reflected wave 12B calculated by using the theoretical model may be fitted to each other, and any frequency characteristic may be applied as long as the parameter related to the bonding layer 1A can be evaluated.

Second Embodiment

Figure 6:
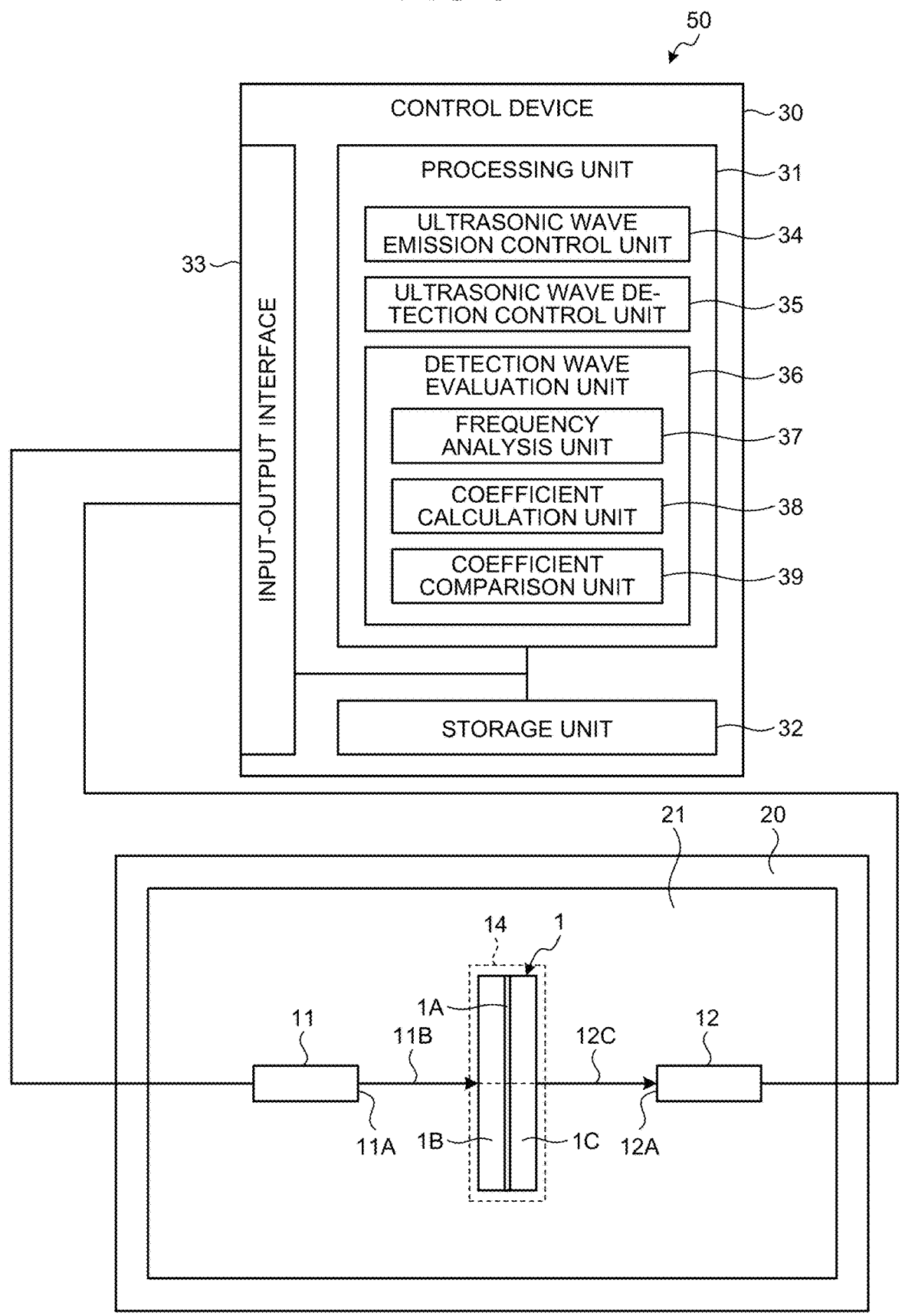
FIG. 6 is a diagram illustrating a specific exemplary configuration of a bonding layer evaluation system according to a second embodiment.

Next, a bonding layer evaluation system 50 and a bonding layer evaluation method according to a second embodiment will be described with reference to FIG. 6. Note that, any part different from the first embodiment will be described in the second embodiment to avoid duplicate description, and the part having a configuration same as that in the first embodiment is denoted by the same reference sign in the description. FIG. 6 is a diagram illustrating a specific exemplary configuration of the bonding layer evaluation system according to the second embodiment.

In the bonding layer evaluation system 50 of the second embodiment, the ultrasonic wave emission device 11 and the ultrasonic wave detection device 12 of the first embodiment are separated from each other and disposed on the respective sides of the evaluation object 1 with the evaluation object 1 interposed therebetween. That is, the installation unit 14 in which the evaluation object 1 is installed is positioned between the ultrasonic wave emission device 11 and the ultrasonic wave detection device 12.

The ultrasonic wave emission device 11, the ultrasonic wave detection device 12, the installation unit 14, are the water tank 20 are disposed as described above in the bonding layer evaluation system 50. Accordingly, the emission wave 11B is emitted from the emission surface 11A of the ultrasonic wave emission device 11. Then, the emission wave 11B is emitted to the evaluation object 1 through the water 21 accumulated in the water tank 20. The emission wave 11B transmits through the evaluation object 1 and becomes a transmitted wave 12C, and the transmitted wave 12C propagates toward the ultrasonic wave detection device 12. Accordingly, the detection surface 12A of the ultrasonic wave detection device 12 detects the transmitted wave 12C.

Furthermore, the emission surface 11A of the ultrasonic wave emission device 11, the detection surface 12A of the ultrasonic wave detection device 12, and the bonding layer 1A of the evaluation object 1 installed in the installation unit 14 are disposed in parallel to one another in the bonding layer evaluation system 50. That is, the evaluation object 1 is disposed in the bonding layer evaluation system 50 so that the ultrasonic wave is emitted in the perpendicular direction to the interface of the bonding layer 1A of the evaluation object 1 and transmitted in the perpendicular direction. Accordingly, in the bonding layer evaluation system 50, the emission wave 11B is emitted in the perpendicular direction to the bonding layer 1A from the emission surface 11A of the ultrasonic wave emission device 11. Furthermore, in the bonding layer evaluation system 50, the transmitted wave 12C that is transmitted through the evaluation object 1 propagates in a direction same as that of the emission wave 11B, and the transmitted wave 12C is detected at the detection surface 12A of the ultrasonic wave detection device 12. Specifically, the emission angles of the emission wave 11B and the incident angle of the transmitted wave 12C are both 0° with respect to the bonding interface of the bonding layer 1A of the evaluation object 1.

Since the detected ultrasonic wave is the transmitted wave 12C, the coefficient calculation unit 38 of the control device 30 calculates the actual value of a transmission coefficient T as the frequency characteristic of the transmitted wave 12C. More specifically, the coefficient calculation unit 38 acquires a frequency function of the actual value of the transmission coefficient T by dividing the intensity of the amplitude spectrum of the transmitted wave 12C by the intensity of the amplitude spectrum of the reference wave for each frequency f. Note that, according to its properties, the transmission coefficient T is a coefficient that takes a value from zero to one inclusive, taking zero when the ultrasonic wave is completely not transmitted, and taking one when the ultrasonic wave is completely transmitted. Note that, the transmission coefficient T is equal to or smaller than one in theory, but can take a value equal to or larger than one in measurement.

The coefficient comparison unit 39 of the control device 30 compares a frequency f at which the actual value of the transmission coefficient T calculated by the coefficient calculation unit 38 has a local maximum and a frequency f at which a theoretical value of the transmission coefficient T calculated based on a theoretical model when it is assumed that the bonding layer 1A has no weak bond but an appropriate bond has a local maximum. The coefficient comparison unit 39 evaluates that the bonding layer 1A has no weak bond when the frequencies match within the range of predetermined error and evaluates that the bonding layer 1A has a weak bond when the frequencies have a significant difference beyond the predetermined error. That is, for each of the frequency function of the actual value of the transmission coefficient T and a frequency function of the theoretical value of the transmission coefficient T, the frequency f at which the value thereof has a local maximum is referred to as a peak frequency.

Note that, the notch frequency of the reflection coefficient R in the bonding layer evaluation method of the first embodiment can be interpreted as the peak frequency of the transmission coefficient T in the bonding layer evaluation method using the bonding layer evaluation system 50 of the second embodiment. That is, it is evaluated that the bonding layer 1A has no weak bond when peak frequencies in the frequency function of the actual value of the transmission coefficient T and a plurality of peak frequencies in the frequency function of the theoretical value of the transmission coefficient T when it is assumed that the spring constant $K_{N2}$ is equal to the spring constant $K_{N1}$ respectively match within the range of predetermined miscalculation. On the other hand, it is evaluated that the bonding layer 1A has a weak bond when the peak frequencies in the frequency function of the actual value of the transmission coefficient T and the plurality of peak frequencies in the frequency function of the theoretical value of the transmission coefficient T when it is assumed that the spring constant $K_{N2}$ is equal to the spring constant $K_{N1}$ respectively have a significant difference beyond the predetermined error.

As described above, according to the second embodiment, it is possible to evaluate whether the bonding layer 1A has a weak bond by using the transmitted wave 12C of the ultrasonic wave, and thus it is possible to detect a weak bond without fracturing the evaluation object 1.

Third Embodiment

Figure 7:
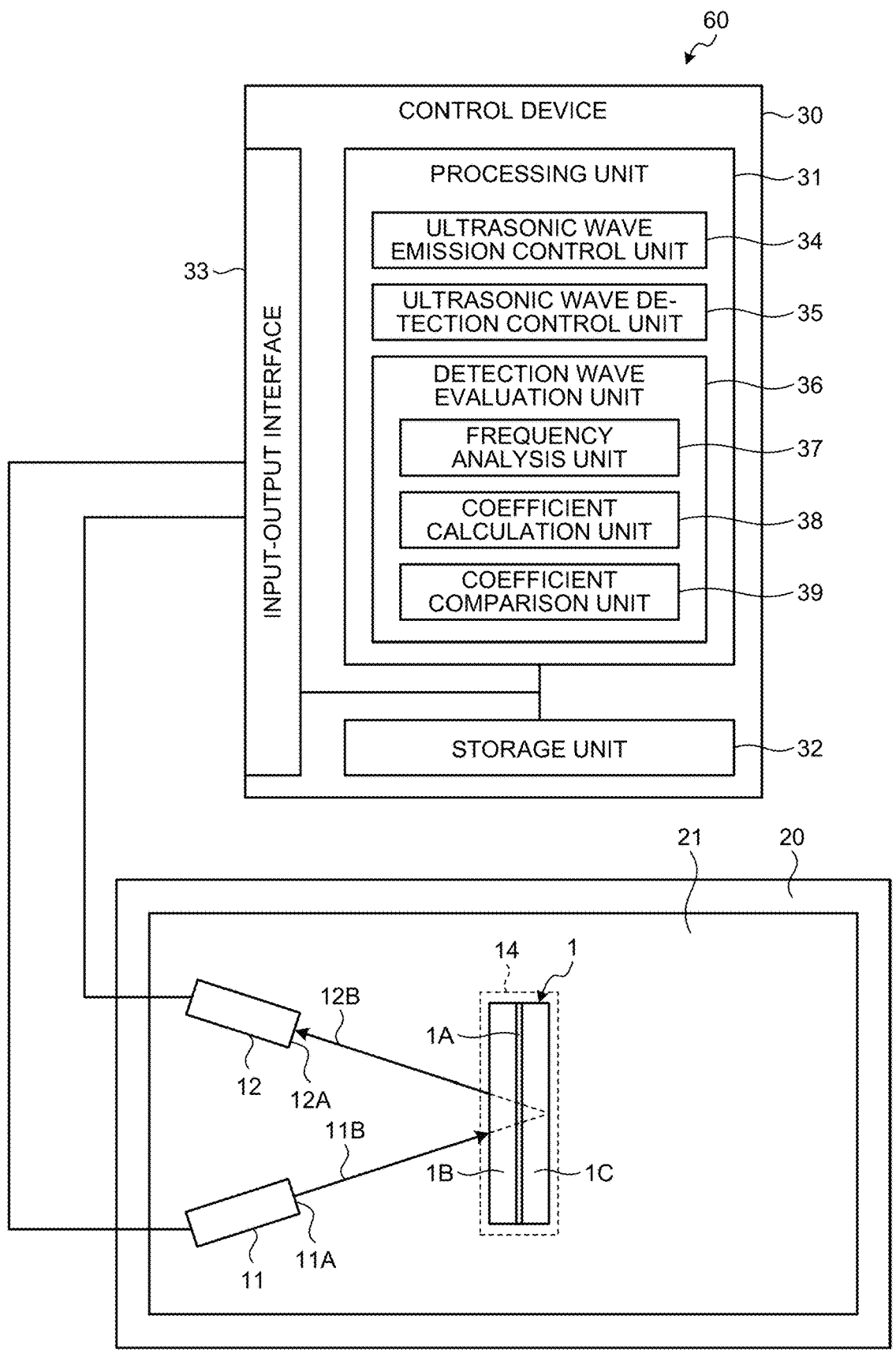
FIG. 7 is a diagram illustrating a specific exemplary configuration of a bonding layer evaluation system according to a third embodiment.
Figure 8:
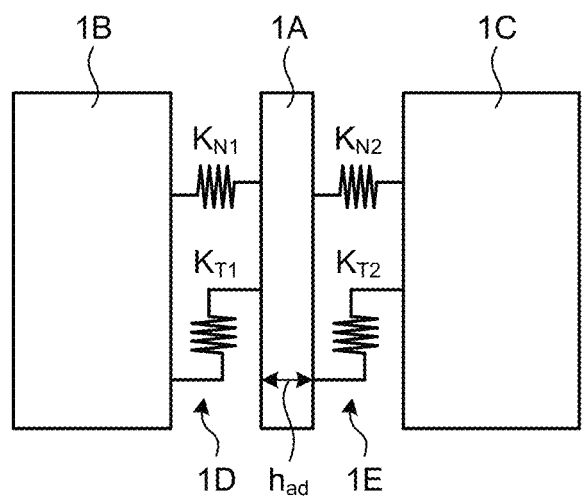
FIG. 8 is an explanatory diagram illustrating an exemplary theoretical model according to the third embodiment.

Next, a bonding layer evaluation system 60 and a bonding layer evaluation method according to a third embodiment will be described with reference to FIGS. 7 and 8. Note that, any part different from the first and second embodiments will be described in the third embodiment to avoid duplicate description, and any part having a configuration same as that in the first and second embodiments is denoted by the same reference sign in the description. FIG. 7 is a diagram illustrating a specific exemplary configuration of the bonding layer evaluation system according to the third embodiment. FIG. 8 is an explanatory diagram illustrating an exemplary theoretical model according to the third embodiment.

In the bonding layer evaluation system 60 of the third embodiment, the ultrasonic wave emission device 11 and the ultrasonic wave detection device 12 of the first embodiment are separated from each other, and oblique angle incidence is performed that the ultrasonic wave is emitted at a predetermined tilt angle to the bonding interface of the bonding layer 1A of the evaluation object 1. That is, the ultrasonic wave emission device 11 and the ultrasonic wave detection device 12 are provided on a side to which the ultrasonic wave from the evaluation object 1 is reflected. Furthermore, the ultrasonic wave emission device 11 emits the emission wave 11B at a predetermined incident angle to the bonding interface of the bonding layer 1A of the evaluation object 1. The ultrasonic wave detection device 12 detects the reflected wave 12B that is reflected at a predetermined reflection angle.

The ultrasonic wave emission device 11, the ultrasonic wave detection device 12, the installation unit 14, are the water tank 20 are disposed as described above in the bonding layer evaluation system 60. Accordingly, the emission wave 11B is emitted from the emission surface 11A of the ultrasonic wave emission device 11. Then, the emission wave 11B is emitted to the evaluation object 1 through the water 21 accumulated in the water tank 20. Part of the emission wave 11B is reflected by the evaluation object 1 and becomes the reflected wave 12B, and the reflected wave 12B propagates toward the ultrasonic wave detection device 12. Accordingly, the detection surface 12A of the ultrasonic wave detection device 12 detects the reflected wave 12B.

Furthermore, in the bonding layer evaluation system 60, the emission surface 11A of the ultrasonic wave emission device 11 is disposed at a tilt relative to the interface of the bonding layer 1A of the evaluation object 1 installed in the installation unit 14, and the detection surface 12A of the ultrasonic wave detection device 12 is disposed at a tilt relative to the interface of the bonding layer 1A of the evaluation object 1 installed in the installation unit 14. That is, in the bonding layer evaluation system 60, the evaluation object 1 is disposed so that the ultrasonic wave is emitted and reflected in tilt directions relative to the perpendicular direction to the bonding interface of the bonding layer 1A of the evaluation object 1. Accordingly, in the bonding layer evaluation system 60, the emission wave 11B is emitted in a tilt direction from the emission surface 11A of the ultrasonic wave emission device 11 to the bonding layer 1A. Furthermore, in the bonding layer evaluation system 60, the reflected wave 12B that is reflected by the evaluation object 1 propagates in a tilt direction symmetric to the emission wave 11B with respect to the perpendicular direction, and the reflected wave 12B is detected at the detection surface 12A of the ultrasonic wave detection device 12.

Since the detected ultrasonic wave is the reflected wave 12B in a tilt direction, the coefficient comparison unit 39 of the control device 30 uses a theoretical model illustrated in FIG. 8 to calculate the theoretical value of the reflection coefficient R used at the reflection coefficient comparison step S23.

In the theoretical model illustrated in FIG. 8, the evaluation object 1 is an object in which the spring interface 1D is provided at the interface between the bonding target body 1B and the bonding layer 1A, the spring interface 1E is provided at the interface between the bonding layer 1A and the bonding target body 1C, and the bonding layer 1A is connected by the two spring interfaces 1D and 1E. In the theoretical model, the bonding interface stiffness at the spring interface 1D is set with the spring constant $K_{N1}$ [in the unit of MPa/nm] and a spring constant $K_{T1}$ [in the unit of MPa/nm], and the bonding interface stiffness at the spring interface 1E is set with the spring constant $K_{N2}$ [in the unit of MPa/nm] and a spring constant $K_{T2}$ [in the unit of MPa/nm]. The spring constants $K_{N1}$ and $K_{N2}$ is set so that the bonding interface stiffness at the spring interfaces 1D and 1E is a stiffness component in the perpendicular direction. The spring constants $K_{T1}$ and $K_{T2}$ is set so that the bonding interface stiffness at the spring interfaces 1D and 1E is a stiffness component in the in-plane direction of the bonding interface orthogonal to the perpendicular direction.

Note that, in the bonding layer evaluation method using the bonding layer evaluation system 60 of the third embodiment, the theoretical model of the third embodiment can be used in place of the theoretical model of the first embodiment. That is, the reflection coefficient R calculated by using the theoretical model of the third embodiment can consider the spring constant $K_{N2}$ for the stiffness component in the perpendicular direction and the spring constant $K_{T2}$ for the stiffness component in the in-plane direction. Accordingly, not only the bonding interface stiffness of the bonding layer 1A in the perpendicular direction but also the bonding interface stiffness thereof in the in-plane direction (shear direction) can be evaluated.

As described above, according to the third embodiment, it is possible to evaluate whether a weak bond exists in the perpendicular direction and the in-plane direction at the interface of the bonding layer 1A, and thus it is possible to detect a weak bond without fracturing the evaluation object 1.

Fourth Embodiment

Figure 9:
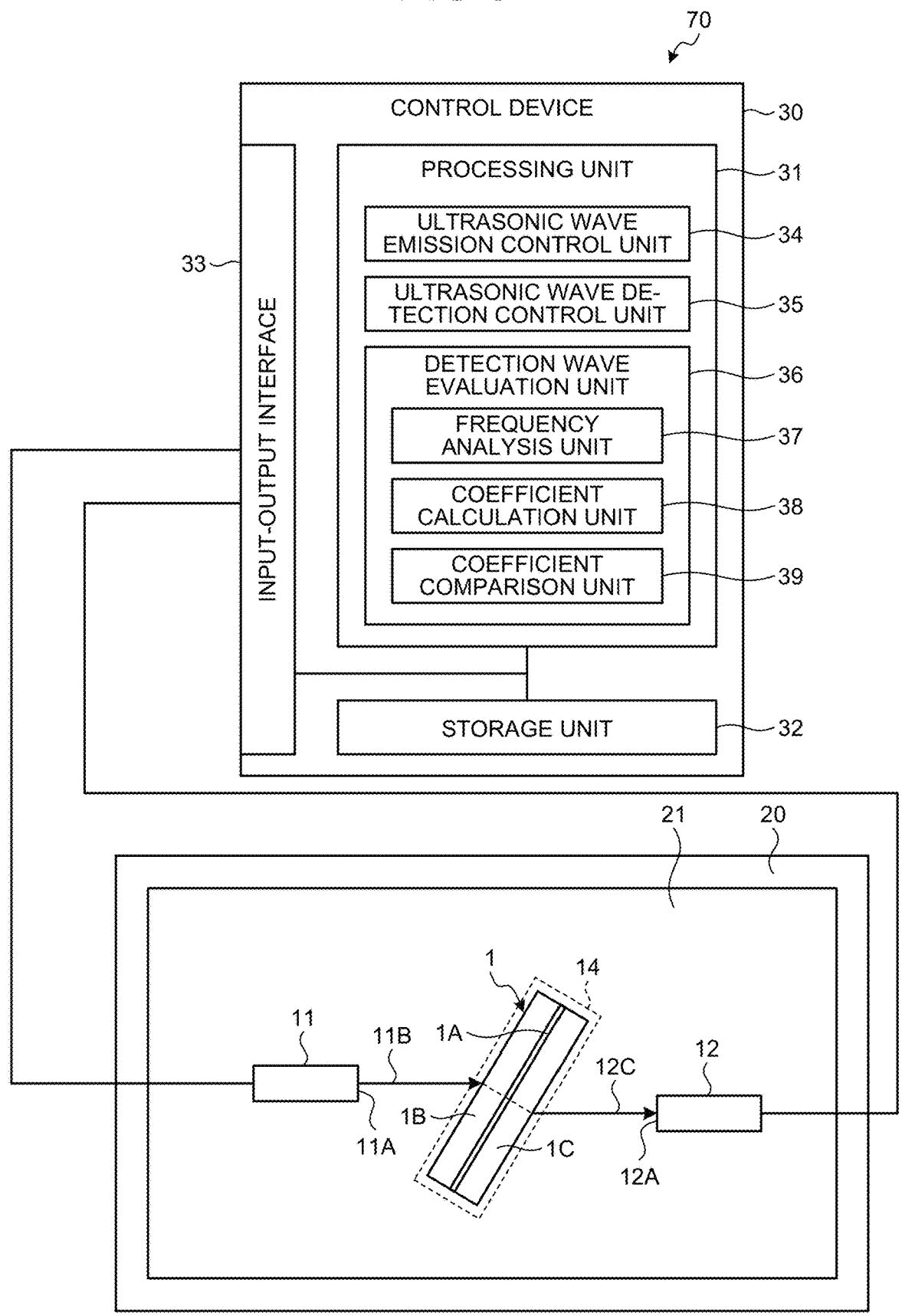
FIG. 9 is a diagram illustrating a specific exemplary configuration of a bonding layer evaluation system according to a fourth embodiment.

Next, a bonding layer evaluation system 70 and a bonding layer evaluation method according to a fourth embodiment will be described with reference to FIG. 9. Note that, any part different from the second embodiment will be described in the fourth embodiment to avoid duplicate description, and any part having a configuration same as that in the second embodiment is denoted by the same reference sign in the description. FIG. 9 is a diagram illustrating a specific exemplary configuration of the bonding layer evaluation system according to the fourth embodiment.

In the bonding layer evaluation system 70 of the fourth embodiment, oblique angle incidence is performed that the ultrasonic wave is emitted at a predetermined tilt angle to the bonding interface of the bonding layer 1A of the evaluation object 1 disposed between the ultrasonic wave emission device 11 and the ultrasonic wave detection device 12 of the second embodiment. That is, the evaluation object 1 installed in the installation unit 14 is disposed at a tilt relative to the emission direction of the emission wave 11B. Accordingly, the ultrasonic wave emission device 11 emits the emission wave 11B at a predetermined incident angle to the bonding interface of the bonding layer 1A of the evaluation object 1. The ultrasonic wave detection device 12 detects the transmitted wave 12C that is transmitted at the predetermined emission angle.

Furthermore, in the bonding layer evaluation system 70, the interface of the bonding layer 1A of the evaluation object 1 installed in the installation unit 14 is disposed at a tilt relative to the emission surface 11A of the ultrasonic wave emission device 11 and disposed at a tilt relative to the detection surface 12A of the ultrasonic wave detection device 12. Note that, the emission surface 11A of the ultrasonic wave emission device 11 and the detection surface 12A of the ultrasonic wave detection device 12 are disposed in parallel to each other. At this time, since the ultrasonic wave is refracted in the evaluation object 1, the positions of the emission surface 11A of the ultrasonic wave emission device 11 and the detection surface 12A of the ultrasonic wave detection device 12 are shifted from each other by an amount corresponding to the refraction. That is, in the bonding layer evaluation system 70, the evaluation object 1 is disposed so that the ultrasonic wave is emitted and transmitted in tilt directions relative to the perpendicular direction to the interface of the bonding layer 1A of the evaluation object 1. Accordingly, in the bonding layer evaluation system 70, the emission wave 11B is emitted in a tilt direction from the emission surface 11A of the ultrasonic wave emission device 11 to the bonding layer 1A. Furthermore, in the bonding layer evaluation system 70, the transmitted wave 12C through the evaluation object 1 is emitted in a tilt direction relative to the perpendicular direction, and the transmitted wave 12C is detected at the detection surface 12A of the ultrasonic wave detection device 12.

Since the detected ultrasonic wave is the transmitted wave 12C in a tilt direction, the coefficient comparison unit 39 of the control device 30 uses a peak frequency at which the actual value of the transmission coefficient T has a local maximum as in the second embodiment, and uses a theoretical model illustrated in FIG. 8 to calculate the theoretical value of the transmission coefficient T used at the reflection coefficient comparison step S23 as in the third embodiment.

Note that, in the bonding layer evaluation method using the bonding layer evaluation system 70 of the fourth embodiment, the parameter related to the bonding layer 1A can be evaluated by executing steps same as those in the first embodiment by using the peak frequency of the second embodiment and the theoretical model of the third embodiment in FIG. 8.

As described above, according to the fourth embodiment, it is possible to evaluate whether a weak bond exists in the perpendicular direction and the in-plane direction at the interface of the bonding layer 1A by using the transmitted wave 12C of the ultrasonic wave, and thus it is possible to detect a weak bond without fracturing the evaluation object 1.

Note that, in the first to fourth embodiments, the reflected wave 12B or the transmitted wave 12C is used as the ultrasonic wave, but a scattered wave that is generated at the evaluation object 1 may be used instead.

REFERENCE SIGNS LIST 1 evaluation object
1A bonding layer
1B, 1C bonding target body
1D, 1E spring interface
10 bonding layer evaluation system
11 ultrasonic wave emission device
11A emission surface
11B emission wave
12 ultrasonic wave detection device
12A detection surface
12B reflected wave
12C transmitted wave
13 ultrasonic wave probe
14 installation unit
20 water tank
21 water
30 control device
31 processing unit
32 storage unit
33 input-output interface
34 ultrasonic wave emission control unit
35 ultrasonic wave detection control unit
36 detection wave evaluation unit
37 frequency analysis unit
38 coefficient calculation unit
39 coefficient comparison unit
41 frequency function curve of actual value
42 frequency function curve of theoretical value
50 bonding layer evaluation system
60 bonding layer evaluation system
70 bonding layer evaluation system

The invention claimed is:

1. A bonding layer evaluation system, comprising:
an elastic wave generation device configured to generate an elastic wave at an evaluation object including a bonding layer;
an elastic wave detection device configured to detect the elastic wave from the evaluation object; and
a control device configured to evaluate a parameter related to the bonding layer of the evaluation object, wherein
the control device is configured to
compare an actual value of a frequency characteristic of the elastic wave detected by the elastic wave detection device and a theoretical value of the frequency characteristic of the elastic wave calculated based on a theoretical model related to the evaluation object and
evaluate the parameter related to the bonding layer based on a result of the comparison,
the elastic wave generation device is an ultrasonic wave generation device configured to generate an ultrasonic wave at the evaluation object,
the elastic wave detection device is an ultrasonic wave detection device configured to detect the ultrasonic wave from the evaluation object,
the ultrasonic wave generation device and the ultrasonic wave detection device are each provided on a side to which the ultrasonic wave is reflected by the evaluation object, and
the control device is further configured to
calculate the actual value of a reflection coefficient of the elastic wave as the actual value of the frequency characteristic of the elastic wave based on the elastic wave detected by the elastic wave detection device,
calculate a notch frequency of the actual value, which is the frequency at which the value becomes a minimum based on the actual value of the reflection coefficient of the elastic wave,
obtain a theoretical notch frequency, which is a frequency at which the theoretical value of a reflection coefficient of the elastic wave as the theoretical value of the frequency characteristic of the elastic wave is minimum,
adjust a difference between the notch frequency of the theoretical value and the notch frequency of the actual value to be within a predetermined range by changing the parameters related to the bonding layer in the theoretical model,
derive parameters regarding the bonding layer at that time, and
evaluate that the bonding layer has a weak bond when the derived parameter related to the bonding layer is lower than a parameter related to the bonding when an appropriate bond is formed.

2. The bonding layer evaluation system according to claim 1, wherein the control device is configured to analyze the actual value of the frequency characteristic of the ultrasonic wave
based on a reference wave that is the ultrasonic wave reflected by a reflection body disposed in place of the evaluation object and
based on the ultrasonic wave detected by the ultrasonic wave detection device.

3. The bonding layer evaluation system according to claim 1, wherein
the evaluation object includes the bonding layer and a bonding target body bonded by the bonding layer,
the ultrasonic wave generation device is an ultrasonic wave emission device configured to emit the ultrasonic wave to an interface of the bonding layer in a perpendicular direction,
the theoretical model related to the evaluation object is a theoretical model in which the bonding layer is connected to the bonding target body by a spring interface,
a stiffness component in the perpendicular direction is set at the spring interface, and
the control device is further configured to calculate the theoretical value of the frequency characteristic of the ultrasonic wave based on the theoretical model by using a stiffness matrix method.

4. The bonding layer evaluation system according to claim 1, wherein
the evaluation object includes the bonding layer and a bonding target body bonded by the bonding layer,
the ultrasonic wave generation device is an ultrasonic wave emission device configured to emit the ultrasonic wave in a tilt direction relative to a perpendicular direction orthogonal to an interface of the bonding layer, the theoretical model related to the evaluation object is a theoretical model in which the bonding layer is connected to the bonding target body by a spring interface,
a stiffness component in the perpendicular direction and a stiffness component in an in-plane direction of the interface are set at the spring interface, and
the control device is further configured to calculate the theoretical value of the frequency characteristic of the ultrasonic wave based on the theoretical model by using a stiffness matrix method.

5. The bonding layer evaluation system according to claim 1, wherein
the evaluation object includes the bonding layer and two bonding target bodies bonded by the bonding layer,
in the theoretical model, one of the bonding target bodies and the bonding layer are connected by a first spring interface, and another of the bonding target bodies and the bonding layer are connected by a second spring interface, and
stiffness set to at least one of the first spring interface and the second spring interface is set as stiffness with which a bond is determined as the appropriate bond.

6. The bonding layer evaluation system according to claim 1, wherein
the bonding target body bonded by the bonding layer includes two bonding target bodies in the evaluation object,
in the theoretical model, one of the bonding target bodies and the bonding layer are connected by a first spring interface, and another of the bonding target bodies and the bonding layer are connected by a second spring interface, and
stiffness set to at least one of the first spring interface and the second spring interface is set as stiffness with which a bond is determined as the appropriate bond.

7. A bonding layer evaluation system, comprising:
an elastic wave generation device configured to generate an elastic wave at an evaluation object including a bonding layer;
an elastic wave detection device configured to detect the elastic wave from the evaluation object; and
a control device configured to evaluate a parameter related to the bonding layer of the evaluation object, wherein
the control device is configured to compare an actual value of a frequency characteristic of the elastic wave detected by the elastic wave detection device and a theoretical value of the frequency characteristic of the elastic wave calculated based on a theoretical model related to the evaluation object and evaluate the parameter related to the bonding layer based on a result of the comparison,
the elastic wave generation device is an ultrasonic wave generation device configured to generate an ultrasonic wave at the evaluation object,
the elastic wave detection device is an ultrasonic wave detection device configured to detect the ultrasonic wave from the evaluation object,
the ultrasonic wave generation device is an ultrasonic wave emission device configured to emit the ultrasonic wave toward the evaluation object,
the ultrasonic wave detection device is configured to detect a transmitted wave that is the ultrasonic wave transmitted through the evaluation object, and
the ultrasonic wave generation device and the ultrasonic wave detection device are provided on respective sides of the evaluation object with the evaluation object interposed between the ultrasonic wave generation device and the ultrasonic wave detection device, and
the control device is further configured to
calculate the actual value of a transmission coefficient of the elastic wave as the actual value of the frequency characteristic of the elastic wave based on the elastic wave detected by the elastic wave detection device,
calculate a peak frequency of the actual value, which is the frequency at which the value becomes a maximum based on the actual value of the transmission coefficient of the elastic wave,
obtain a theoretical peak frequency, which is a frequency at which the theoretical value of a transmission coefficient of the elastic wave as the theoretical value of the frequency characteristic of the elastic wave is maximum,
adjust a difference between the peak frequency of the theoretical value and the peak frequency of the actual value to be within a predetermined range by changing the parameters related to the bonding layer in the theoretical model,
derive parameters regarding the bonding layer at that time, and
evaluate that the bonding layer has a weak bond when the derived parameter related to the bonding layer is lower than a parameter related to the bonding when an appropriate bond is formed.

8. The bonding layer evaluation system according to claim 7, wherein the control device is configured to analyze the actual value of the frequency characteristic of the ultrasonic wave based on a reference wave that is the ultrasonic wave detected when the evaluation object is not disposed and based on the ultrasonic wave detected by the ultrasonic wave detection device.

9. A bonding layer evaluation method, comprising:
detecting an elastic wave from an evaluation object including a bonding layer;
comparing an actual value of a frequency characteristic of the detected elastic wave and a theoretical value of the frequency characteristic of the elastic wave calculated based on a theoretical model related to the evaluation object; and
evaluating a parameter related to the bonding layer based on a result of the comparison, the evaluating comprising:
deriving the parameter related to the bonding layer by changing the parameter related to the bonding layer in the theoretical model so that a notch frequency with which the frequency characteristic has the theoretical value is fitted to a notch frequency with which the frequency characteristic has the actual value, and
evaluating that the bonding layer has a weak bond when the derived parameter related to the bonding layer is lower than a parameter related to the bonding when an appropriate bond is formed.

10. The bonding layer evaluation method according to claim 9, wherein evaluating the parameter includes
calculating a frequency characteristic through frequency analysis of each of the detected elastic wave and a reference wave for correcting the elastic wave,
calculating an actual value of an elastic body coefficient of the frequency characteristic based on a spectrum intensity ratio between the elastic wave and the reference wave, the spectrum intensity ratio being obtained through the frequency analysis, and evaluating the parameter related to the bonding layer of the evaluation object by comparing the calculated actual value of the elastic body coefficient and a theoretical value of the elastic body coefficient calculated based on the theoretical model.

* * * * *